United States Patent
Miura et al.

(10) Patent No.: US 6,918,058 B2
(45) Date of Patent: Jul. 12, 2005

(54) SEMICONDUCTOR INTEGRATED CIRCUIT, SYSTEM BOARD AND DEBUGGING SYSTEM

(75) Inventors: Takashi Miura, Yokohama (JP); Takashi Miyamori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 471 days.

(21) Appl. No.: 10/028,804

(22) Filed: Dec. 28, 2001

(65) Prior Publication Data

US 2002/0087918 A1 Jul. 4, 2002

(30) Foreign Application Priority Data

Dec. 28, 2000 (JP) ..................................... P2000-402630

(51) Int. Cl.$^7$ ............................................... G06F 11/00
(52) U.S. Cl. ............................. 714/30; 714/31; 714/45
(58) Field of Search ............................. 714/30, 31, 45

(56) References Cited

U.S. PATENT DOCUMENTS

| | | | | |
|---|---|---|---|---|
| 5,790,871 A | * | 8/1998 | Qureshi et al. | 710/260 |
| 5,978,937 A | | 11/1999 | Miyamori et al. | |
| 6,065,078 A | * | 5/2000 | Falik et al. | 710/100 |
| 6,115,763 A | * | 9/2000 | Douskey et al. | 710/72 |
| 6,311,302 B1 | * | 10/2001 | Cassetti et al. | 714/727 |
| 6,324,614 B1 | * | 11/2001 | Whetsel | 714/726 |
| 6,601,189 B1 | * | 7/2003 | Edwards et al. | 714/30 |
| 6,687,865 B1 | * | 2/2004 | Dervisoglu et al. | 714/726 |
| 6,691,266 B1 | * | 2/2004 | Winegarden et al. | 714/724 |
| 2002/0184562 A1 | * | 12/2002 | Nadeau-Dostie et al. | 714/30 |

FOREIGN PATENT DOCUMENTS

| | | |
|---|---|---|
| JP | 3-268159 | 11/1991 |
| JP | 8-185336 | 7/1996 |
| JP | 2752592 | 2/1998 |

* cited by examiner

Primary Examiner—Bryce P. Bonzo
(74) Attorney, Agent, or Firm—Oblon, Spivak, McClelland, Maier & Neustadt, P.C.

(57) ABSTRACT

A semiconductor integrated circuit having: an internal main bus; first microprocessor and second microprocessor sharing the internal main bus; a first debug serial bus with one end thereof connected to said first microprocessor; a second debug serial bus with one end thereof connected to the second microprocessor; and a debugging module connected to the other ends of the first debug serial bus and second debug serial bus and transferring at least a debugging program and debugging data to the first microprocessor via said first debug serial bus and to the second microprocessor via the second debug serial bus.

18 Claims, 13 Drawing Sheets

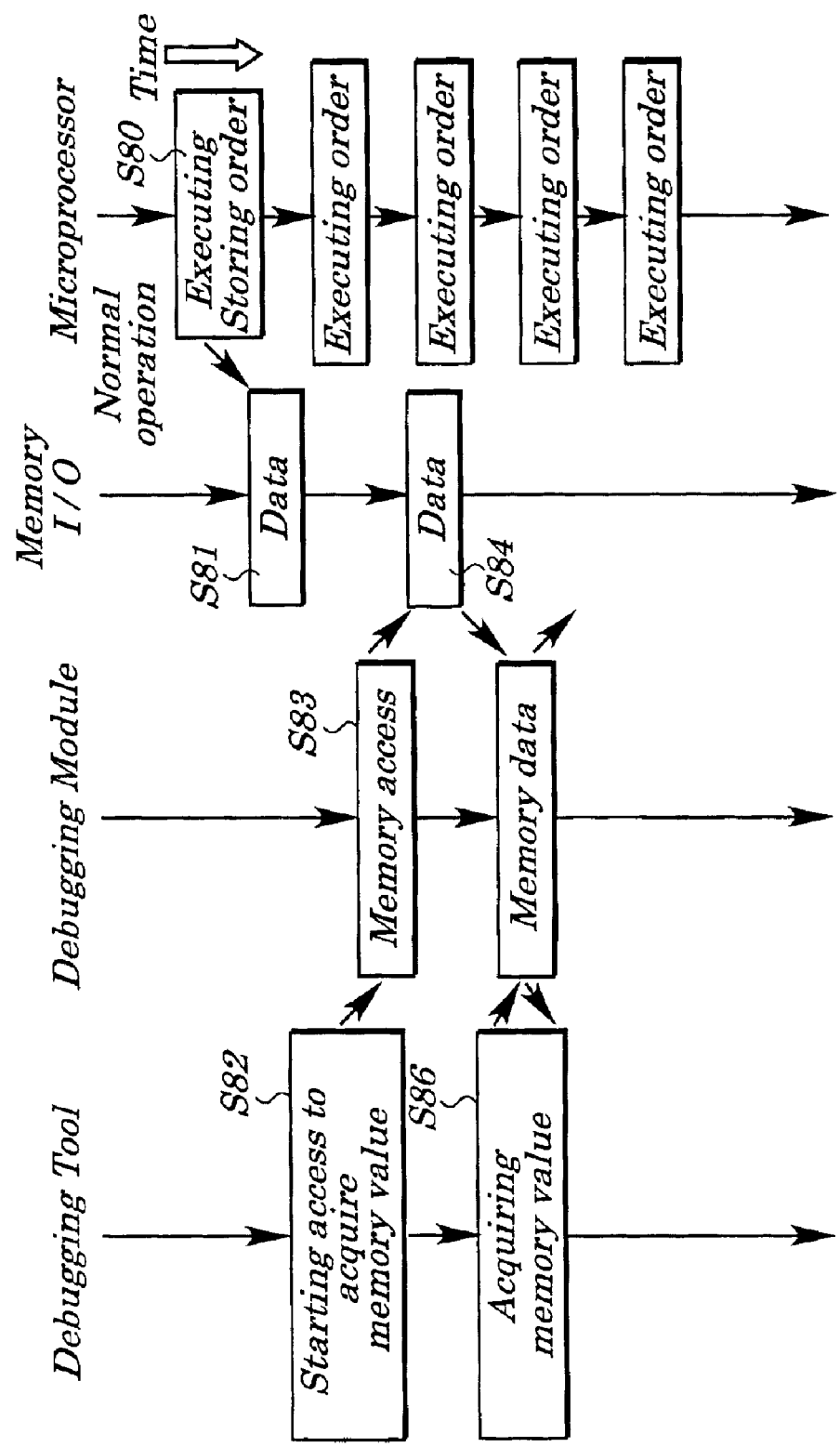

SEMICONDUCTOR INTEGRATED CIRCUIT, SYSTEM BOARD AND DEBUGGING SYSTEM

CROSS REFERENCE TO RELATED APPLICATION

This application is based upon and claims the benefit of priority from the prior Japanese Patent Application No. 2000-402630 filed on Dec. 28, 2000, the entire contents of which are incorporated herein by reference.

BACKGROUND OF THE INVENTION

1. Field of the Invention

The invention relates to a semiconductor integrated circuit, a system board and a debugging system, and more particularly relates not only to a semiconductor integrated circuit which comprises a plurality of microprocessors mounted on a single semiconductor substrate, can monitor and control each of the microprocessors independently, and organically debug the microprocessors but also to a system board for mounting the semiconductor integrated circuit and a debugging system having the system board.

2. Description of the Related Art

Following recent improvements in a semiconductor processing technique, a system LSI (e.g. an ASIC (application specific integrated circuit)) which includes a plurality of microprocessor cores mounted on a single semiconductor substrate such as a silicon chip and is intended for a specific use has been extensively developed. Such a multi-processor is developed for the following reasons. The transaction of the system LSI is divided into a plurality of tasks. Processors which are optimum for the respective tasks are simultaneously operated. This is effective in extensively improving a data processing speed. Further, the microprocessors are mounted on the single silicon chip, which can downsize the system LSI.

A system LSI applied to a multimedia or especially a system LSI which performs image compression/extension is required to compute a great amount of data and complete to process the data on a real time basis. In order to meet these requirements, it is conceivable to provide combined hardware circuits in the system LSI, or to constitute the system LSI using a multiprocessor. The latter is popular at present as described hereinafter.

In the case of the image compression/expansion, the system LSI constituted by the multiprocessor is easy to divide the transaction into a plurality of tasks, and to process them using a pipeline technique due to dependence of information. Further, the system LSI can assign different tasks to one processor by using a time sharing system, so that it is not necessary to provide a plurality of dedicated hardware circuits. In short, the number of dedicated hardware circuits can be reduced. Still further, the system LSI is compatible with modifications of a specification or algorithm by making firmware rewritable. This means that the system LSI itself can easily improve its performance, and that a user can easily improve the performance of the system LSI.

However, the system LSI including a plurality of microprocessors mounted on the single silicon chip seems to suffer from a problem related to debugging system design. Such a problem will be described hereinafter with reference to FIG. 1 and FIG. 2 showing debugging systems 60 and 70, respectively.

Referring to FIG. 1, a debugging system 60 is usually provided not only with a serial port in order to debug microprocessors 604 and 605 but also a user target system 600 to be debugged and a debugging tool 620 to execute a debugging task. The user target system 600 includes a system LSI 601 where the microprocessors 604 and 605 are integrated, an internal memory 602 connected to the system LSI 601, and an I/O interface circuit 603.

The system LSI 601 includes the microprocessors 604 and 605, a debugging module 606, a memory controller 608, a direct memory access (DMA) controller 609 and an I/O controller 610, all of which share the internal main bus 607 and are mutually connected. The debugging module 606 is connected to the debugging tool 620 via an external debug interface 62. Each of the microprocessors 604 and 605 is provided with a processor core 611 and a bus interface unit 612. The debugging module 606 is provided with a serial I/F 613 and an exclusive control semaphore 614.

The system LSI 601 does not have a special debug support unit but can execute debug control using a debugging software program, which is supplied from the debugging tool 620 to the serial I/F 613 of the debugging module 606 via the external debug interface 62, and is visible as a memory image on the internal main bus 607. In the foregoing system LSI 601, the debugging program happens to be simply stored in an external user memory. Anyway, the exclusive control semaphore 614 is usually provided in the system LSI 601 in order to prevent collision of access to of data resources in which both the microprocessors 604 and 605 synchronously gain access to the serial port of the debugging module 606.

Referring to FIG. 1, the debugging system 60 seems to be problematic in the following respects.

(1) First of all, there is a problem of how to debug bugs caused when the microprocessors 604 and 605 synchronously gain access to the same data resource. Especially, a conflicting state of the internal main bus 607 is a very important piece of information for locating bugs, should remain as it is, and should be observed at the time of debugging. Further, debugging should be performed even when the conflicting state becomes serious and the internal main bus 607 is in deadlock.

In the debugging system 60, a debugging software program itself is however supplied from the debugging tool 620 via the debugging module 606 and the internal main bus 607, so that the conflicting state is destroyed and cannot be observed. Precisely, the debugging program cannot be started until the internal main bus 607 is freed from the deadlock.

(2) The internal main bus 607 usually gains access only to the microprocessor 604 or 605. As a result, there is a time difference between instructions provided to the microprocessors 604 and 605, so that the microprocessors 604 and 605 may not operate synchronously. Especially when a user mode is changed to a debugging mode or when the debugging mode is changed to the user mode, it is necessary to maintain relative positions where the program should be executed in the microprocessors 604 and 605 during the transition.

However, when the user mode is resumed after the debugging mode, only one of the microprocessors 604 and 605 is able to provide the instruction and perform memory access. It is assumed here that the microprocessor 604 is instructed to return to the user mode prior to the microprocessor 605. In this case, the microprocessors 604 and 605 receive return instructions at different times, which means that it is impossible to correctly know the relative positions to execute the debugging program.

(3) The microprocessors 604 and 605 gain access to the debugging module 606 via the internal main bus 607, which is not authorized to give the access right to only the microprocessor 604 or 605.

The debugging program is created assuming that the microprocessors 604 and 605 impartially execute the program. Therefore, it is impossible to enable only the microprocessor 604 or 605 to continuously execute the debugging program with preference. This would reduce the execution efficiency of the debugging program.

(4) The debugging system 60 should efficiently control the microprocessors 604 and 605 in order to assure its reliable debugging performance. For this purpose, the debugging system 60 has to determine which the microprocessor 604 or 605 gains access thereto via the internal main bus 607.

However, the microprocessors 604 and 605 cannot be independently controlled at the time of debugging. Therefore, it is necessary to selectively operate the microprocessor 604 or 605 using software which contains information peculiar to the microprocessors 604 and 605. Such a selective operation is necessary for the microprocessor 604 to be controlled, for example, but is not required at all for the other microprocessor 605.

Referring to FIG. 2, a debugging system 70 comprises microprocessors 704 and 705, and a debugging module which offers a debugging function to an external unit when either the microprocessor 704 or 705 is operated. Further, the debugging system 70 includes a user target system 700 and a debugging tool 720, similarly to the debugging system 60 shown in FIG. 1.

The user target system 700 includes a system LSI 701, an internal memory 702 connected to the system LSI 701, and an I/O interface circuit 703.

The system LSI 701 is provided with the microprocessors 704 and 705, a debugging module selector 706, a memory controller 708, a DMA controller 709, and an I/O controller 710. The circuits except for the debugging module selector 706 share the internal main bus 707 and are mutually connected. The debugging module selector 706 is connected to the debugging tool 720 via an external debug interface 72. Each of the microprocessors 704 and 705 is provided with a processor core 711, the debugging module 712, a bus interface unit 713, and a debug support unit 714.

Therefore, the foregoing system LSI 701 can offer a debugging program without using the internal main bus 707. Further, debugging functions of the microprocessors 704 and 705 can be independently controlled. The debugging system 70 can overcome the problems (1), (3) and (4) of the debugging system 60.

However, the debugging system 70 is difficult to solve the problem (2), and still seems to have the following problems.

(1) The debugging tool 720 gains access to the internal memory 720 via the internal main bus 707 in response to instructions of the microprocessor 704 or 705, which would reduce an effective transferring speed of the debugging program.

(2) In the debugging system 70, and especially in the system LSI 701, the microprocessors 704 and 705 include the debugging modules 712, respectively, which unnecessarily enlarges the system LSI 701, and increases a manufacturing cost thereof. Further, the user target system 700 and debugging system 70 would be enlarged and increase their manufacturing costs.

In summary, the debugging system 60 in FIG. 1 has the following problems: (1-1) it is not possible to observe the conflicting state of the internal main bus 607 when the single debugging module 606 for assisting the debugging task uses the software in order to perform debugging control to the microprocessors 604 and 605 which share the internal main bus 607 of the system LSI 601; (1-2) it is impossible to accurately know the relative positional relationship of the debugging programs; (1-3) the microprocessor 604 or 605 cannot operate continuously; and (1-4) the microprocessor 604 or 605 should be selectively operated using the software which includes information peculiar to these microprocessors 604 and 605.

Further, the debugging system 70 in FIG. 2 has the problems: (2-1) it is not possible to accurately know the relative positional relationship of the debugging programs; (2-2) the effective transferring speed of the debugging programs is reduced; (2-3) the circuit configuration is inevitably enlarged; and (2-4) the manufacturing costs are increased.

SUMMARY OF THE INVENTION

In accordance with a first aspect of the invention, there is provided a semiconductor integrated circuit comprising: an internal main bus; first and second microprocessors sharing the internal main bus; a first debug serial bus with one end thereof connected to the first microprocessor; a second debug serial bus with one end thereof connected to the second microprocessor; and a debugging module connected to the other ends of the first and second debug serial buses and transferring at least a debugging program and debugging data to the first microprocessor via the first debug serial bus and to the second microprocessor via the second debug serial bus.

According to a second aspect of the invention, there is provided a system board comprising: a wiring board; a semiconductor integrated circuit which comprises an internal main bus, first and second microprocessors sharing the internal main bus, a first debug serial bus with one end thereof connected to the first microprocessor, a second debug serial bus with one end thereof connected to the second microprocessor, and a debugging module connected to the other ends of the first and second debug serial buses and transferring at least a debugging program and debugging data to the first microprocessor via the first debug serial bus, and to the second microprocessor via the second debug serial bus; and a memory mounted on the wiring board and storing at least debugging data.

In accordance with a third aspect of the invention, there is provided a debugging system comprising: a wiring board; a semiconductor integrated circuit which is mounted on the wiring board and comprises: an internal main bus; first and second microprocessors sharing the main internal bus; a first debug serial bus with one end thereof connected to the first microprocessor; a second debug serial bus with one end thereof connected to the second microprocessor; and a debugging module connected to the other ends of the first and second debug serial buses and transferring at least a debugging program and debugging data to the first microprocessor via the first debug serial bus, and to the second microprocessor via the second debug serial bus; a memory mounted on the wiring board and storing at least debugging data; and a debugging tool connected to the debugging module of the semiconductor integrated circuit.

BRIEF DESCRIPTION OF THE SEVERAL VIEWS OF THE DRAWINGS

FIG. 8 to FIG. 13 are flowcharts showing the operation of the debugging system of the embodiment of the present invention.

DETAILED DESCRIPTION OF THE INVENTION

The invention will be described with reference to a semiconductor integrated circuit, a system board and a debugging system according to an embodiment shown in the accompanying drawings.

[Configuration of Debugging System]

Figure 1:
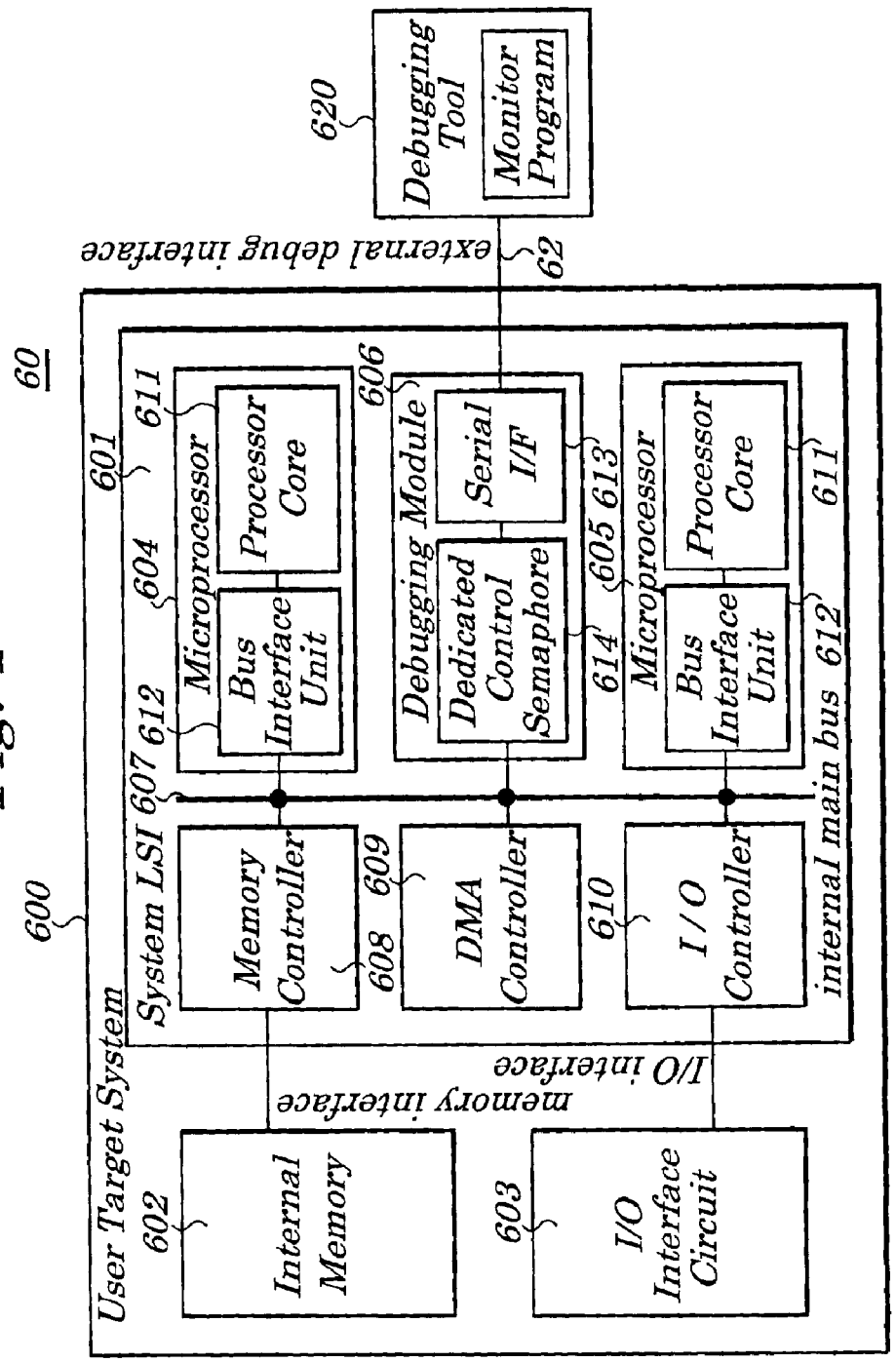
FIG. 1 is a block diagram of a debugging system of the related art.
Figure 2:
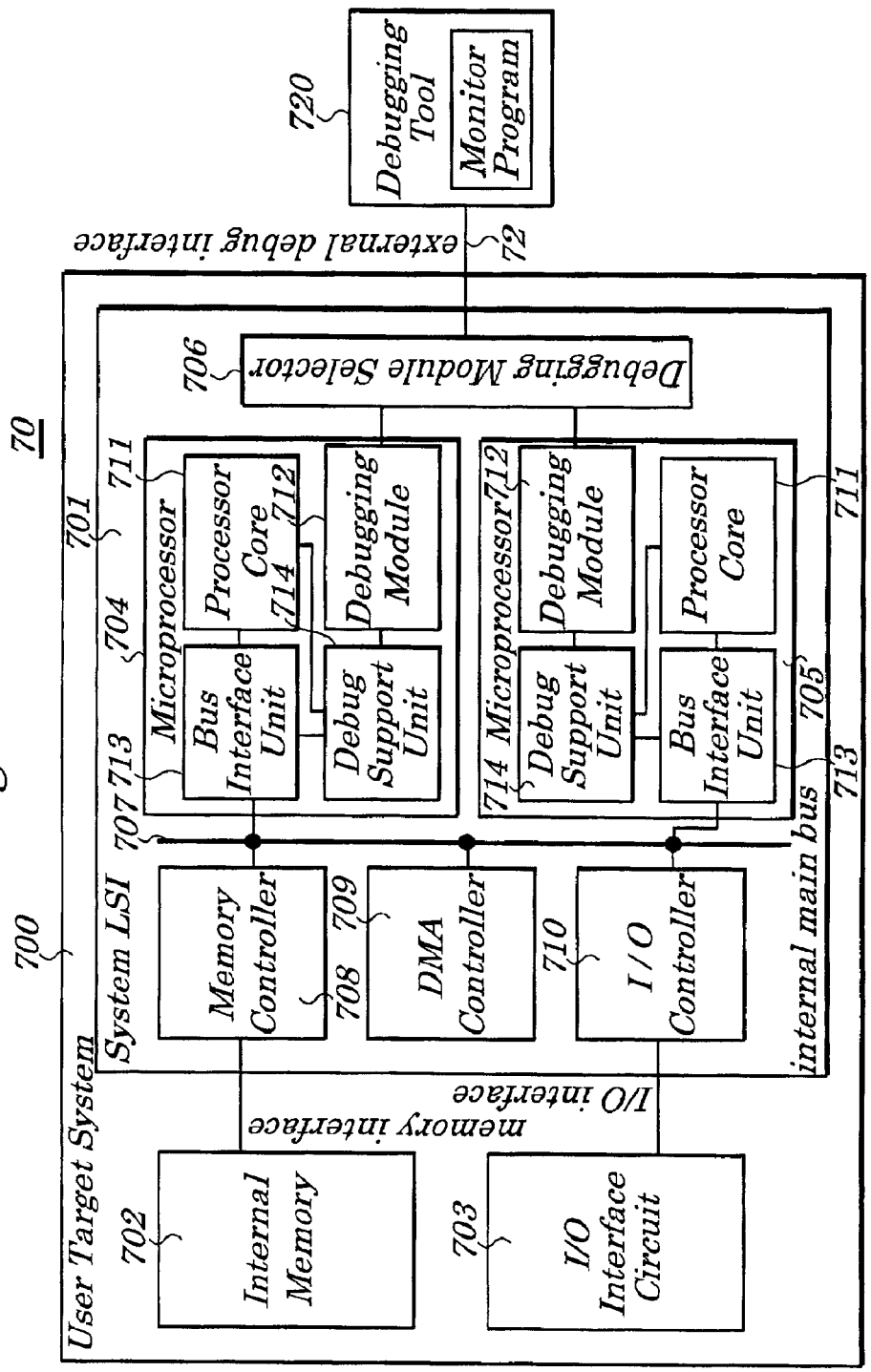
FIG. 2 is a block diagram of another debugging system of the related art.
Figure 3:
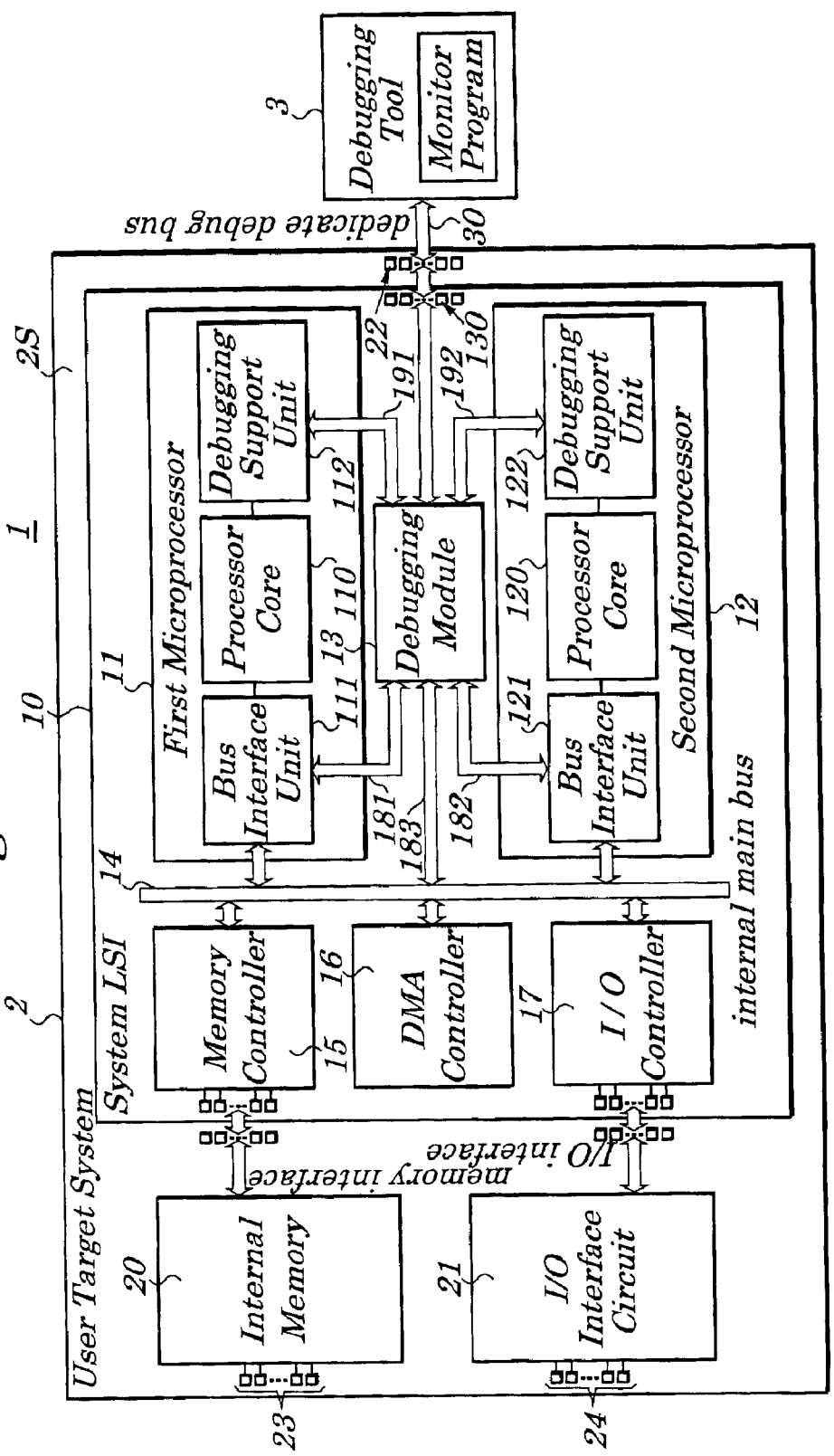
FIG. 3 is a block diagram of a debugging system according to the embodiment of the present invention.

Referring to FIG. 3, a debugging system 1 comprises at least a user target system 2 to be debugged, a system LSI 10 and an internal memory 20 on the user target system 2, and a debugging tool 3 positioned outside the user target system 2 and connected to a debugging module 13 of the system LSI 10.

The system LSI 10 is a semiconductor integrated circuit in which circuits are mounted on a silicon chip, and may be a bare chip or a package having a bare chip therein, for example. The debugging system 1 is designed in order to compute a great amount of information, complete information processing on a real time basis and execute the image compression/expansion. Therefore, the system LSI 10 is constituted as a multi-processor.

The internal memory 20 is a semiconductor integrated circuit in which circuits are integrated on a silicon chip, and may be a bare chip or a package having a bare chip therein, similarly to the system LSI 10. The internal memory 20 stores at least a debugging program, debugging data of the system LSI 10, and so on, and is preferably a DRAM (dynamic random access memory), an SRAM (static random access memory) which can write and read data.

The debugging tool 3 is connected to the user target system 2 in view of the system configuration, but is actually an external unit independent from the user target system 2 in view of hardware. The debugging tool 3 debugs the user target system 2 in accordance with the debugging program.

The user target system 2 further comprises an input/output (I/O) interface circuit 21, which controls a connection to an external main bus of a computer system (not shown) provided outside the user target system 2, and receives and transmits visual and audio signals from and to an external unit.

[Configuration of System Board]

Further referring to FIG. 3, the user target system 2 comprises not only a wiring substrate 2S but also the system LSI 10, I/O interface circuit 21 and internal memory 20 which are on the wiring substrate 2S. In short, the user target system 2 is designed as a system board which performs the image compression/expansion.

The wiring substrate 2S is preferably a printed wiring substrate on which the system LSI 10 and internal memory 20 are mounted and which can electrically connect the system LSI 10, internal memory 20 and I/O interface circuit 21, for example. The printed wiring substrate is constituted by an insulating epoxy group resin as a basic material and a wiring mounted at least thereon. Alternatively, a printed wiring substrate made of a flexible poly-imide group resin, a ceramics substrate, a silicon carbide substrate or a silicon substrate may be used as the printed wiring substrate.

A dedicated interface terminal (a dedicated external debug connector) 22 is positioned near the system LSI 10 at the periphery of the wiring substrate 2S, and connects the system LSI 10 and the debugging tool 3 via a dedicated debug bus 30. An I/O interface terminal 24 is provided near the I/O interface circuit 21 at the periphery of the wiring substrate 2S in order to connect the I/O interface circuit 21 to an external main bus, a video camera, a monitor, a speaker or the like which are positioned outside a computer system.

A memory port 23 is provided near the internal memory 20 at the periphery of the wiring substrate 2S, but may be provided at any other position. When the internal memory 20 does not have a sufficient capacity, the memory port 23 is used to connect the internal memory 20 to an external memory.

When the memory port 23 is a dual port type, it can function as an interface between the user target system 2 and the external main bus or the like, so that the I/O interface circuit 21 and I/O interface terminal 24 are dispensable.

[Configuration of Semiconductor Integrated Circuit]

Referring to FIG. 3, the system LSI 10 comprises: an internal main bus 14; first and second microprocessors 11 and 12 sharing the internal main bus 14; a first debug serial bus 181 with one end thereof connected to the first microprocessor 11; a second debug serial bus 182 with one end thereof connected to the second microprocessor 12; and a debugging module 13 connected to the other ends of the first and second debug serial buses 181 and 182 and transferring at least a debugging program and debugging data to the first microprocessor 11 via the first debug serial bus 181 and to the second microprocessor 12 via the second debug serial bus 182. In the system LSI 10, the two microprocessors 11 and 12 are integrated. However, the number of microprocessors is not limited to 2, and may be 4, 8, . . . and so on.

Further, the system LSI 10 comprises a memory controller 15, a direct memory access (DMA) controller 16 and an input/output (I/O) controller 17, all of which are connected to the internal main bus 14.

The first microprocessor 11 comprises a first processor core 110, a first bus interface unit 111 and a first debug support unit 112. The first bus interface unit 111 is connected not only to the first microprocessor core 110 but also to the first debug serial bus 181 and the internal main bus 14.

The first debug serial bus 181 provides a monitoring program for the debugging task from the debugging tool 3 to the first microprocessor 11 without via the internal main bus 14. The first debug support unit 112 is connected to the debugging module 13 via a first debug control bus 191, thereby controlling the debugging function of the first microprocessor 11, i.e. the debugging tool 3 can monitor and control a register which executes and controls operations in a debugging mode.

The second microprocessor 12 comprises a second microprocessor core 120, a second bus interface unit 121 and a second debug support unit 122. The second debug serial bus 182 provides a monitoring program for executing the debugging task from the debugging tool 3 to the second microprocessor 12 without via the internal main bus 14. The second bus interface unit 121 is connected to the second microprocessor core 120, second debug serial bus 182 and internal main bus 14. The second debug support unit 122 is connected to the debugging module 13 via a second debug control bus 192, thereby controlling the debugging function of the second microprocessor 12 similarly to the first debug support unit 112.

In the system LSI 10, a dedicated external debugging terminal (bonding pad) 130 is connected to and is provided near the debugging module 13. Further, the dedicated external terminal 130 is connected to a dedicated debug interface terminal 22 of the user target system 2. In short, the debugging module 13 and the debugging tool 3 are connected via the dedicated external debug terminal 130, dedicated debug interface terminal 22 and dedicated debug bus 30.

In the system LSI 10, the debugging module 13 is directly connected to the internal main bus 14 via a direct bus 183.

In this embodiment, the system LSI 10 is constituted by the first and second microprocessors 11 and 12 which execute the user mode and debugging mode, and share the internal main bus 14. The modes executed by the first and second microprocessors 11 and 12 are independently controlled, and are continuously monitored by the first and second bus interface units 111 and 121 in order to detect a change of a mode executing state of the first or second microprocessor 11 or 12. In synchronization with the change of the mode executing state, either the first or second microprocessor 11 or 12 will be shifted to the debugging mode, which enables the first and second microprocessors 11 and 12 to have the debugging function.

The debugging module 13 can perform memory access, which is necessary for executing the debugging program, to the internal main bus 14 via the direct bus 183, compared with the memory access performed by the first and second microprocessors 11 and 12. Therefore, it is possible to maintain not only the state of the internal main bus 14 when there is a bug but also the conflicting state of the microprocessors 11 and 12, and to restore the maintained conflicting state. Further, the following operations can be synchronously carried out: the first microprocessor 11 performs the memory access via the first debug serial bus 181 which is independent from the internal main bus 14; the second microprocessor 12 performs the memory access via the second debug serial bus 182; and the same data are simultaneously supplied to the first and second microprocessors 11 and 12. This is effective in accelerating the execution of the debugging program.

The debugging module 13 is directly connected to the internal main bus 14 and gains access to a memory space of the internal memory 20 without via the first and second microprocessors 11 and 12, both of which are accessible to the memory space.

The internal main bus 14 and the dedicated debug bus 30 (including 10 the dedicated external debug terminal 130 and dedicated debug interface terminal 22) are used to enable the debugging tool 3 to directly access the internal memory 20 and so on which are indirectly connected on the internal main bus 14.

(a) Configuration of Debugging Module

Figure 4:
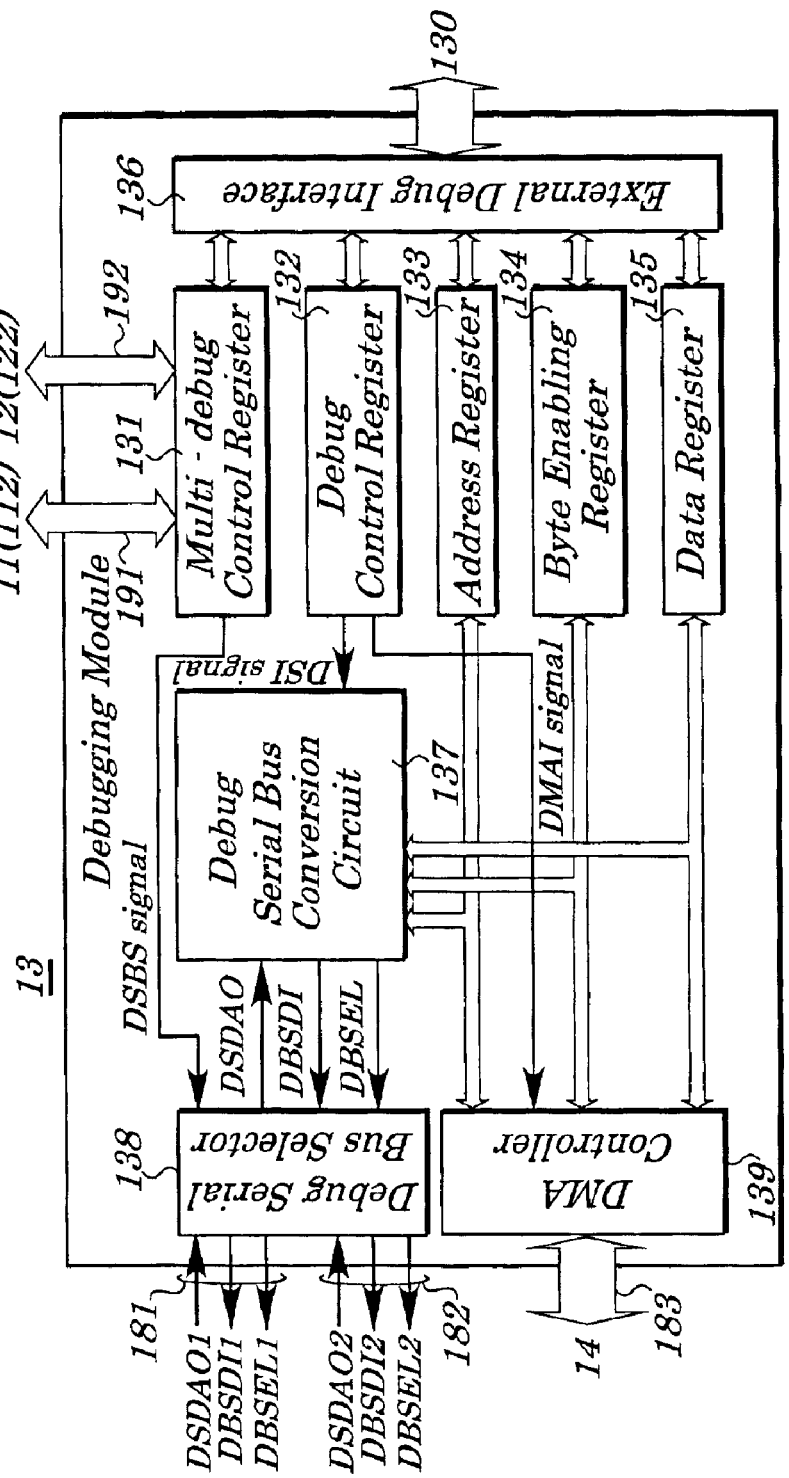
FIG. 4 is a block diagram of a debugging module used in the debugging system shown in FIG. 3.

Referring to FIG. 4, the debugging module 13 comprises at least a multi-debug control register 131, a debug control register 132, an address register 133, a byte enabling register 134, a data register 135, an external debug interface 136, a debug serial bus conversion circuit 137, a debug serial bus selector 138 and an internal DMA controller 139.

The external debug interface 136 is connected to the multi-debug control register 131, debug control register 132, address register 133, byte enabling register 134 and data register 135. The external debug interface 136 receives debug task setting data from the debugging tool 3 via the dedicated debugging bus 30. The multi-debug control register 131, debug control register 132, address register 133, byte enabling register 134 and data register 135 set the debugging task on the basis of the received data. The external debug interface 136 provides the set contents to the debugging tool 3 via the dedicated debugging bus 30.

The multi-debug control register 131 is connected not only to the first debug support unit 112 of the first microprocessor 11 via a first debug control bus 191 but also to the second debug support unit 122 of the second microprocessor 12 via the second debug control bus 192. The multi-debug control register 131 monitors the operating states of the first and second microprocessors 11 and 12. When either the first or second microprocessor 11 or 12 is put into a debug state due to breaking or the like, the multi debug control register 131 takes measures against the debug state, i.e. issues debug interruption signals to both of the first and second microprocessors 11 and 12 in order to forcibly place them in the debugging mode. Further, as soon as either the first or second microprocessor 11 or 12 starts the debugging mode, the multi-debug control register 131 issues the debug interruption signal to the first or second microprocessor 11 or 12.

The multi-debug control register 131 transmits a debug serial bus signal selecting to the debug serial bus selector 138. In response to the debug serial bus selecting signal, the debug serial bus selector 138 selects either the first or second debug serial bus 181 or 182. The debug serial bus conversion circuit 137 is activated by a debug start serial signal transmitted from the debug control register 21. In response to the activation of the debug serial bus conversion circuit 137, data are exchanged between the selected first or second debug serial bus 181 or 182, address register 133, byte enabling register 134 and data register 135. The debug starting serial signal is issued when the first microprocessor 11 connected to the selected first debug serial bus 181 or the second microprocessor 12 connected to the selected second debug serial bus 182 is in the debugging mode.

The debug control register 132 issues a DMA starting signal to the internal DMA controller 139 in order to activate it. When activated, the internal DMA controller 139 performs the memory access to the internal main bus 14 on the basis of the debugging task data stored in the address register 133, byte enabling register 134 and data register 135. As a result, regardless of the debugging mode of the first or second microprocessor 11 or 12, the debugging tool 3 (shown in FIG. 3) is connected to the internal main bus 14 via the debugging module 13 and performs the memory access thereto.

(b) Configuration of Debug Control Bus

Figure 5:
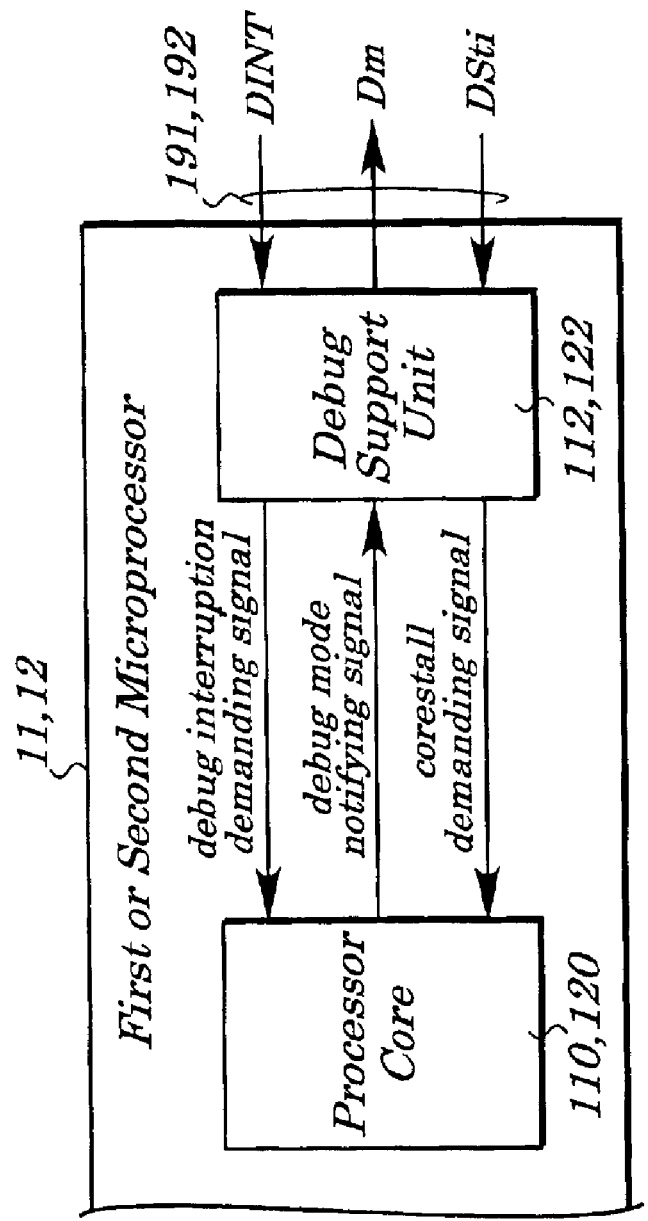
FIG. 5 is a block diagram of a microprocessor used in the debugging system of FIG. 3.

Referring to FIG. 5, each of the first and second debug control buses 191 and 192 is a group of wirings for transferring at least a DINT signal, a Dm signal and a DStl signal.

Functions of the foregoing signals will be described with respect to the first microprocessor 11. When the first microprocessor 11 starts the debugging mode, the first processor core 110 outputs a debugging mode notifying signal to the first debug supporting unit 112, which outputs the Dm signal to the debugging module 13 in order to notify that the debugging mode is being started.

The debugging mode notifying signal is asserted under the following conditions 1, 2 and 3.

Under the condition 1, the first debug support unit 112 receives and detects the DINT signal. The Dm signal is produced when the first debug support unit 112 outputs the debug interruption demanding signal to the first processor core 110 on the basis of the detected result.

Under the condition 2, the Dm signal is issued when the first debug support unit 112 detects the debug interruption signal, and outputs the debug interruption demanding signal to the first processor core 110.

Under the condition 3, the Dm signal is issued when the first processor core 110 executes a debug excluding demand and shifts to the debugging mode.

Receiving the DStl signal, the first debug support unit 112 outputs a core-stall requesting signal to the first processor core 110. The first microprocessor 11 delays executing the user mode while the core-stall demanding signal is being outputted. Further, the core-stall demanding signal is used as a delay demanding signal for enabling the first and second microprocessors 11 and 12 to start the user mode in synchronization.

The foregoing description is also applicable to the second microprocessor 12, and will not be repeated here.

(c) Configuration of Debug Serial Bus and Bus Interface Unit

Figure 6:
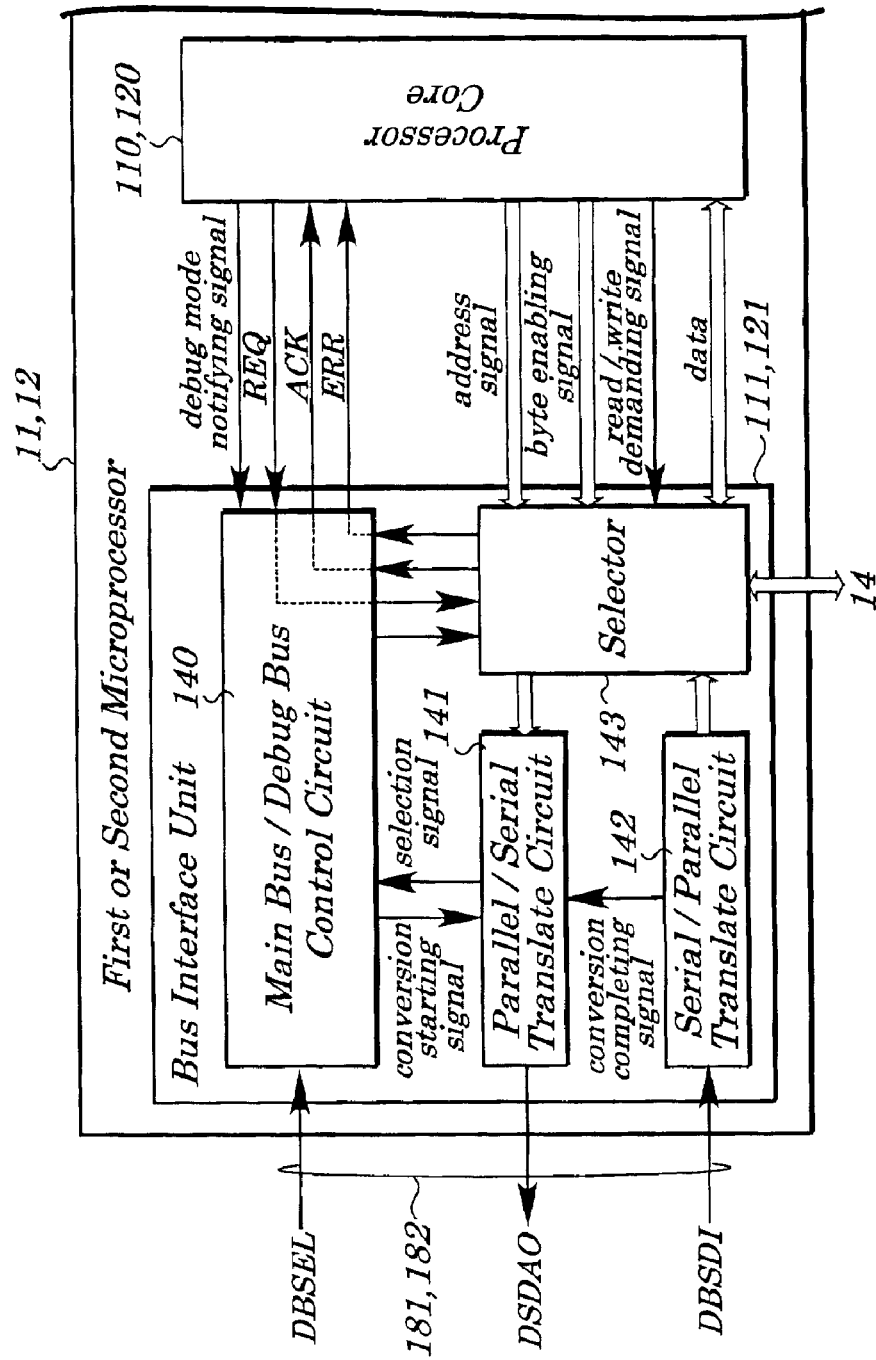
FIG. 6 is a block diagram of a bus interface unit of the microprocessor in the debugging system of FIG. 3.

Referring to FIG. 6, each of the first and second debug control buses 191 and 192 is a group of wirings for transferring at least a DBSEL signal, a DSDAO signal and a DBSDI signal. The first debug serial bus 181 has its one end connected to the first bus interface unit 111 of the first microprocessor 11 and the other end thereof connected to the debugging module 13. The second debug serial bus 182 has its one end connected to the second bus interface unit 121 of the second microprocessor 12 and the other end thereof connected to the debugging module 13.

As shown in FIG. 6, each of the first and second bus interface units 111 and 121 is provided with at least the main bus/debug bus control circuit 140, parallel-to-serial conversion circuit 141, serial-to-parallel conversion circuit 142, and selector 143.

In the first microprocessor 11, the debug mode notifying signal is transmitted to the main bus/debug bus control circuit 140 from the first processor core 110. In response to this signal, the main bus/debug bus control circuit 140 selects a signal for the memory access to the internal main bus 14 and the debug serial bus 181. The signal used for the memory access is an REQ signal, an ACK signal, an ERR signal, the address signal, the byte enabling signal, a read/write demanding signal, data signal or the like.

While the debug mode notifying signal is being transmitted, the selector 143 provides the parallel-to-serial conversion circuit 141 with the address signal, byte enabling signal, read/write demanding signal and data signal in response to a selection signal from the main bus/debug bus control circuit 140. On the other hand, during the absence of the debug mode notifying signal, the selector 143 sends all of the demands related to the memory access to the internal main bus 14 in response to the selection signal.

In response to the DBSEL signal from the debugging module 13, the main bus/debug bus control circuit 140 sends a conversion starting signal to the parallel-to-serial conversion circuit 141. Thereafter, the parallel-to-serial conversion circuit 141 converts the signals related to the memory access into the DSDAO signal, and starts transferring the serial data. When data reading is requested, the serial-to-parallel conversion circuit 142 receives data as the DBSDI signal from the debugging module 13, and converts the received data. After converting the data, the serial-to-parallel conversion circuit 142 transmits a conversion completing signal to the parallel-to-serial conversion circuit 141. Further, the converted data are transmitted to the first processor core 110 via the selector 143.

The REQ, ACK and ERR signals which serve as control signals for the memory access are produced in response to the conversion starting and completing signals. The serial data are transferred as the DSDAO and DBSDI signals when the main bus/debug bus control circuit 140 receives the DBSEL signal.

The foregoing description is also applicable to the second microprocessor 12, and will not be repeated here.

(d) Configuration of Dedicated Debug Bus

Figure 7:
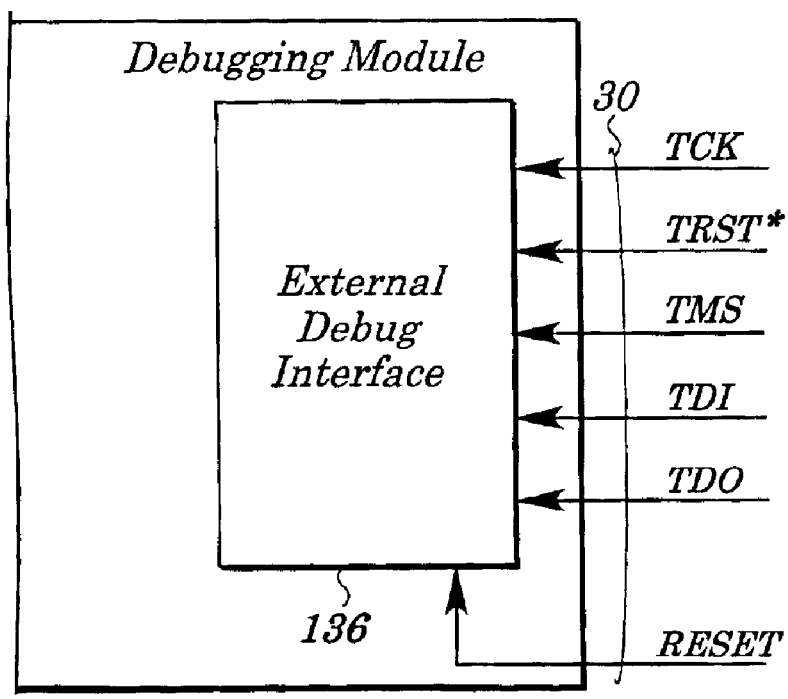
FIG. 7 is a block diagram of an external debug interface of the debugging module of FIG. 4.

Referring to FIG. 7, the dedicated debug bus 30 connects the debugging module 13 to the external debugging tool 3, and is a group of wirings for transferring at least a TCK signal, a TRST* signal, a TMS signal, a TDI signal and a TDO signal. The dedicated debug bus 30 transmits these signals to the debugging tool 3 via the external debug interface 136 of the debugging module 13. The external debug interface 136 also receives a RESET signal.

Receiving the RESET signal, the external debug interface 136 will be reset. Receiving the TRST* signal, only the external debug interface 136 will be reset. The TCK and TMS signals are used for the external debug interface 136 to determine a register setting state. The TDI signal is used to select a register to be used actually and to assure a register setting value. The TDO signal is used to monitor the determined state of the register setting value.

[Operation of Debugging System]

The debugging system 1 performs its essential operations such as the operation control and resource access as described hereinafter with reference to FIG. 8 to FIG. 13.

(a) Execution Operation Control: Stopping Normal Operation

The most essential operation of the debugging system 1 is to stop the normal operation of the first and second microprocessors 11 and 12.

Figure 8:
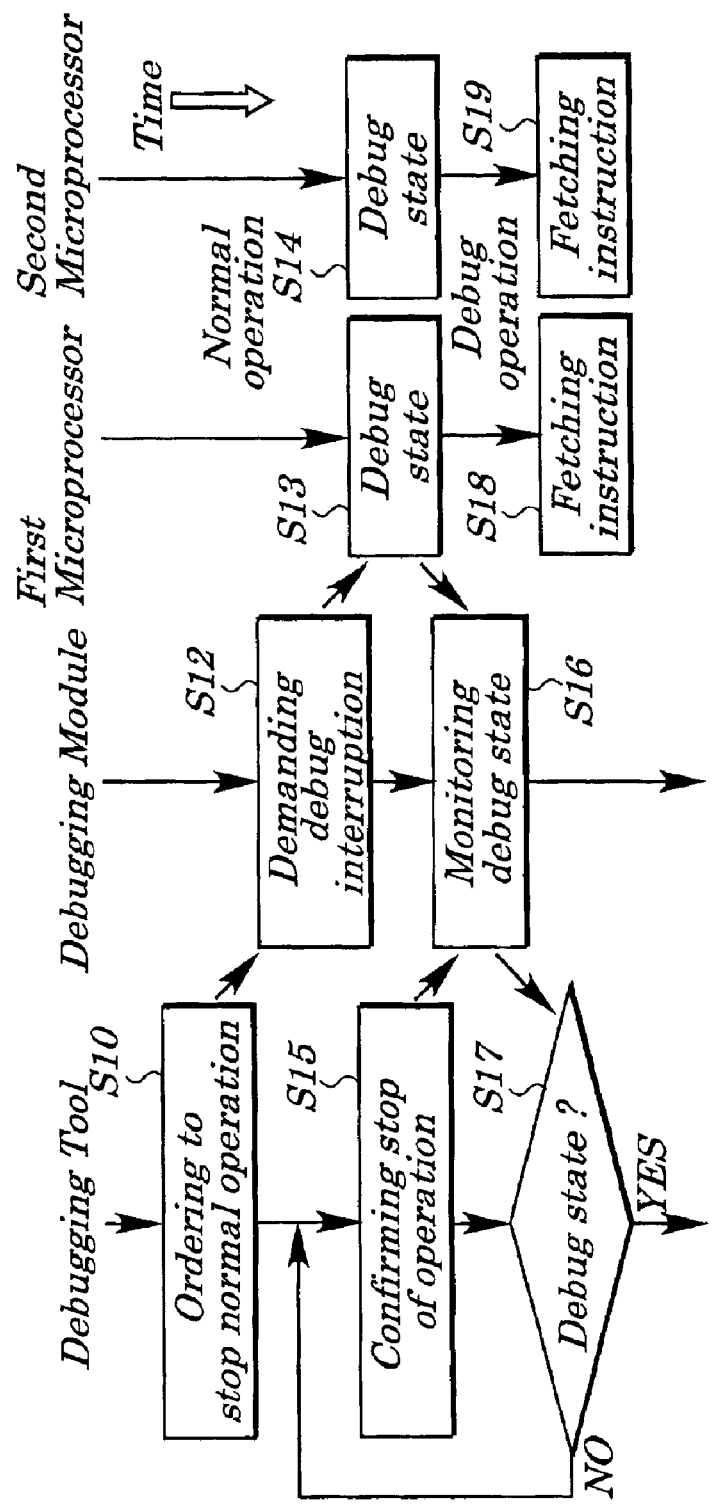

(1) As shown in FIG. 8, the debugging tool 3 orders the debugging module 13 to let the first and second microprocessors 11 and 12 simultaneously shift to the debugging mode and stop the normal operation (step S10).

(2) Thereafter, the debugging module 13 transmits the debug interruption demanding signal to the first and second debug control buses 191 and 192 (step S13).

(3) In response to the foregoing signal, the first and second microprocessors 11 and 12 stop the normal operation, and shift to the debugging mode (steps S13 and S14).

(4) The first and second microprocessors 11 and 12 inform the debugging module 13 of the shift to the debugging mode via the first and second debug control bus 191 and 192, respectively.

(5) The debugging tool 3 orders the debugging module 13 to check whether or not the first and second microprocessors 11 and 12 are in the debug state (step S15). The debugging module 13 monitors the debug state of the first and second microprocessors 11 and 12 (step S16). The debugging tool 3 keeps on issuing the foregoing order until the debug state of the first and second microprocessors 11 and 12 is confirmed (step S17).

(6) The first and second microprocessors 11 and 12 transmit a debug state fetching instruction to the first and second debug serial buses 181 and 182, and stop operating (steps S18 and S19).

In the foregoing essential operations of the debugging system 1, the first and second microprocessors 11 and 12 can stop their operations when the instruction fetching demand and the data access are transmitted to the first and second debug serial buses 181 and 182. In short, during the debugging operation, the memory access can be performed only to a particular address area via the first or second debug serial bus 181 or 182. Further, this memory access can be performed at the beginning of the debugging operation. Therefore, the debugging task can be started without using the internal main bus 14. Even if the internal main bus 14 suffers from bugs, the debugging task can be started without destroying the state of the internal main bus 14.

(b) Execution Operation Control: Resuming Normal Operation

The first and second microprocessors 11 and 12 stop the debugging mode, and resume the normal operation as described hereinafter. In this embodiment, the debugging system 1 does not have hardware for directly ordering the normal operation, which can reduce a manufacturing cost. The normal operation can be carried out when the first and second processor cores 110 and 120 of the first and second microprocessors 11 and 12 execute the instruction.

Figure 9:
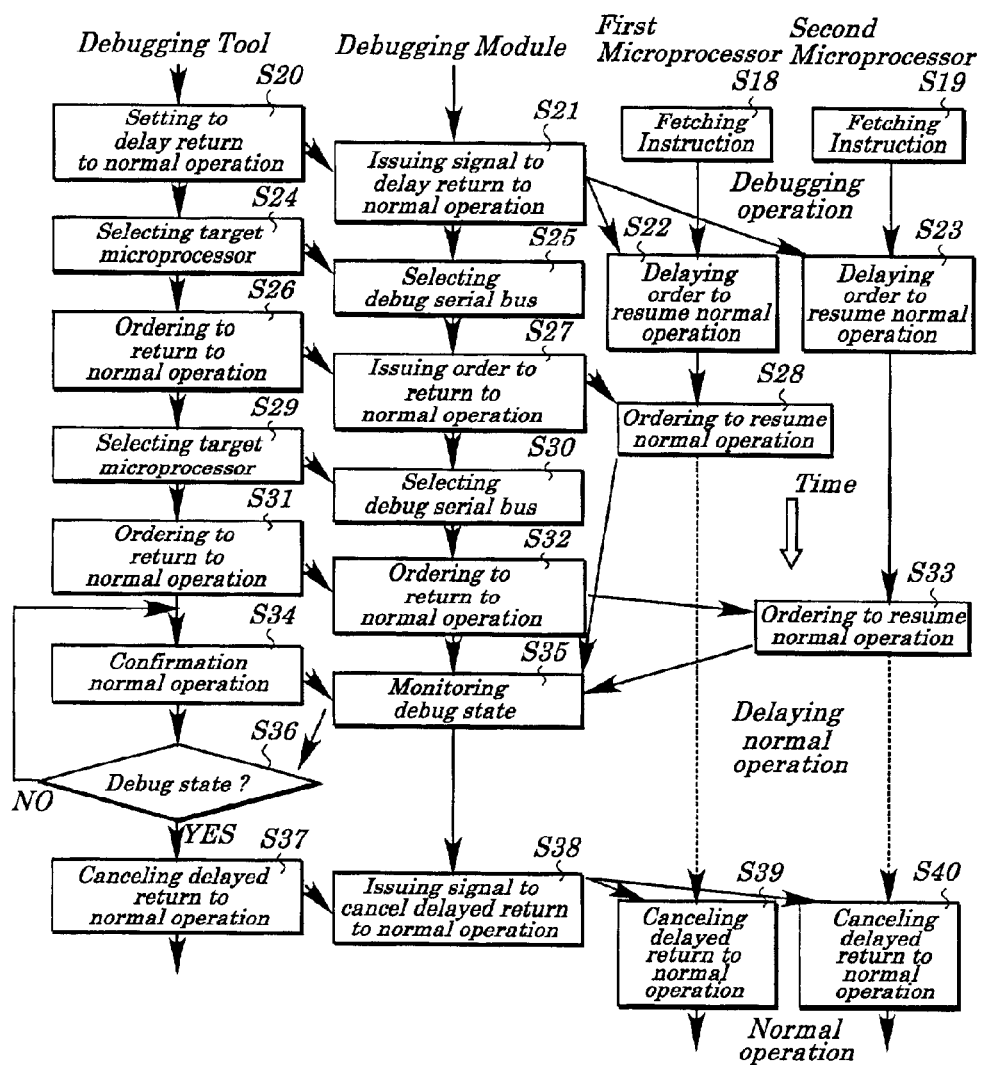

(1) Referring to FIG. 9, in the debugging system 1, the debugging tool 3 orders the debugging module 13 to delay resuming the normal operation even when the first and second microprocessors 11 and 12 respond to the instruction to stop the debugging mode and resume the user mode (step S20).

(2) In response to the instruction, the debugging module 13 provides a normal operation delaying signal to the first and second microprocessors 11 and 12 (step S21). Therefore, the first and second microprocessors 11 and 12 delay executing the normal operation instruction (steps S22 and S23).

(3) First of all, the first microprocessor 11 resumes the normal operation as follows. The debugging tool 3 instructs the debugging module 13 to select the first debug serial bus 181 and first microprocessor 11 to which the normal operation resuming demand is transmitted (step S24). Then, the debugging module 13 selects the first debug serial bus 181 (step S25). The debugging tool 3 orders the debugging module 13 to transmit a normal operation resuming code to the first debug serial bus 181 (step S26). The debugging module 13 provides the normal operation resuming instruction to the first microprocessor 11 via the first debug serial bus 181 (step S27). The first microprocessor 11 tries to resume the normal operation in response to the normal operation resuming instruction (step S28). However, since the normal operation resuming instruction is delayed as described above (step S22), no normal operation will be actually resumed. The first microprocessor 11 informs the debugging module 13 that the debug state is canceled in response to the normal operation resuming instruction.

(4) The second microprocessor 12 resumes the normal operation as described hereinafter. The debugging tool 3 orders the debugging module 13 to select the second debug serial bus 182 and the second microprocessor 12 to which the normal operation resuming demand is supplied (step S29). The debugging module 13 accordingly selects the second debug serial bus 182 (step S30). The debugging tool 3 orders the debugging module 13 to transmit the normal operation resuming code to the second debug serial bus (step S31). Therefore, the debugging module 13 transmits the normal operation resuming demand to the second microprocessor 12 via the second debug serial bus 182 (step S32). The second microprocessor 12 tries to resume the normal operation (step S33). However, since the normal operation resuming instruction is delayed in this state as described above (step S23), the normal operation cannot be resumed. In response to the normal operation resuming instruction, the second microprocessor 12 informs the debugging module 13 that the debug state is canceled.

(5) The debugging tool 3 orders the debugging module 13 to monitor whether the first and second microprocessors 11 and 12 are released from the debug state (steps S34, S35 and S36).

(6) The debugging module 13 confirms that the first and second microprocessors 11 and 12 have been released from the debug state, and informs this to the debugging tool 3 (step S35). Thereafter, the debugging tool 3 orders the debugging module 13 to cancel the normal operation delaying instruction for the first and second microprocessors 11 and 12 (step S37).

(7) The debugging module 13 orders the first and second microprocessors 11 and 12 to cancel the normal operation delaying instruction (step S38). As a result, the first and second microprocessors 11 and 12 resume the normal operation (steps S39 and S40).

The first and second microprocessors 11 and 12 can resume the normal operation without using the internal main bus 14 as described with respect to the stopping of the normal operation. In short, the normal operation can be resumed without destroying the state in which the internal main bus 14 stops the normal operation.

Further, the debugging system 1 can delay ordering to resume the normal operation, so that timing to let the first and second microprocessors 11 and 12 resume the normal operation can be easily controlled. In other words, the first and second microprocessors 11 and 12 can resume the normal operation at the same time or at different times. For instance, it is possible to artificially create a state in which a plurality of microprocessors are synchronously operated and scramble for one resource (e.g. the internal memory 20, I/O interface 21 or the like). Therefore, bugs can be efficiently detected, i.e. the debugging task can be effectively carried out.

(c) Execution Operation Control: Synchronously Stopping Normal Operation

In the debugging system 1, the first and second microprocessors 11 and 12 stop operating synchronously as described hereinafter.

Figure 10:
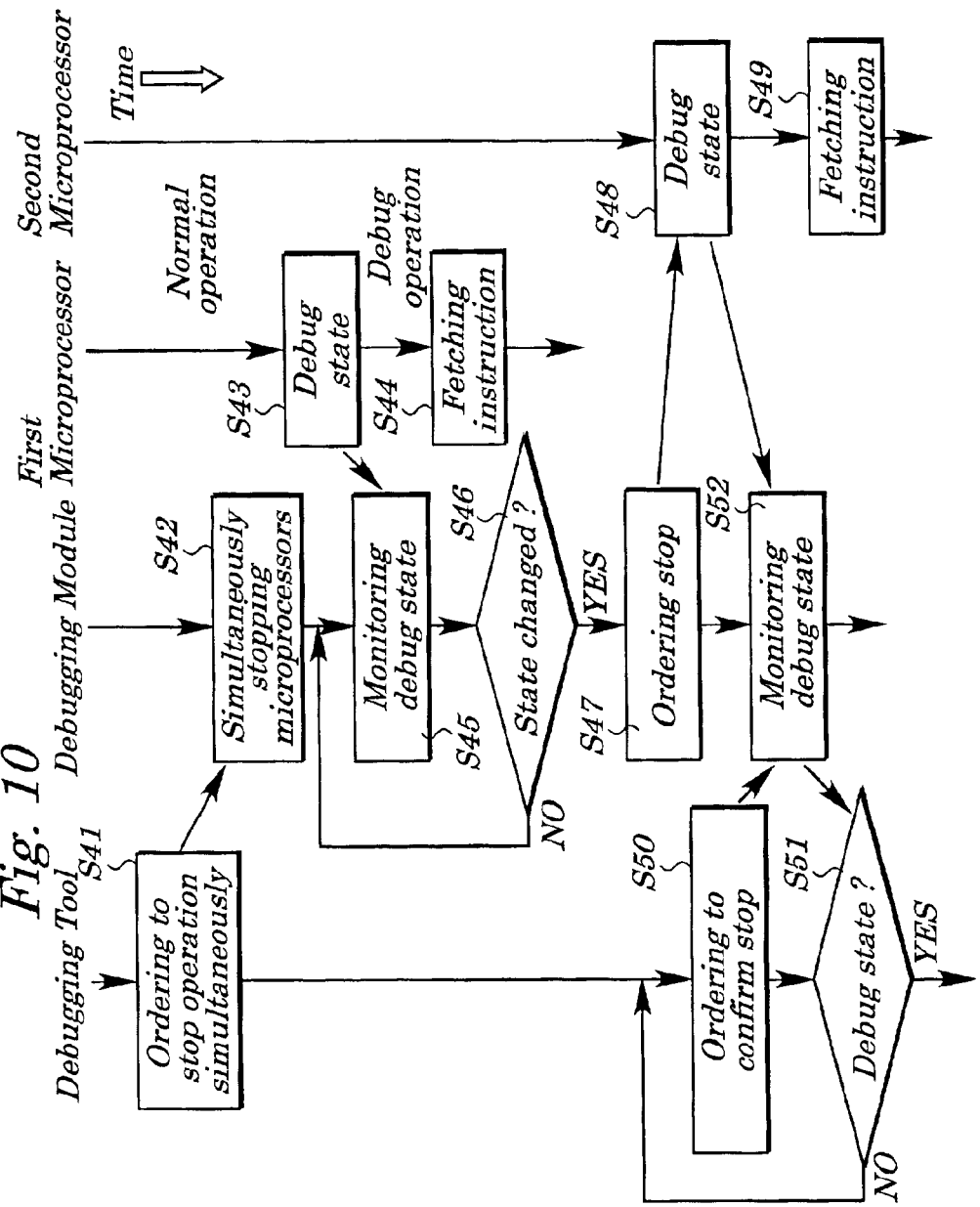

(1) As shown in FIG. 10, the debugging tool 3 informs, via the dedicated debug bus 30, the debugging module 13 that the first and second microprocessors 11 and 12 should be synchronously stopped (step S41). The debugging module 13 prepares for synchronously stopping the first and second microprocessors 11 and 12 (step S42).

(2) The debug interruption instruction is issued at a break point in the first microprocessor 11. In response to the debug interruption instruction, the first microprocessor 11 shifts to the debug state, and notifies the debugging module 13 that the first microprocessor 11 shifts to the debug state (step S43). The first microprocessor 11 stops operating with a debug state fetching request transmitted to the first debug serial bus 181 (step S44).

(3) The debugging module 13 monitors changes in the debug state of the first and second microprocessors 11 and 12 (step S45). When detecting that there is a change in the debug state of the first microprocessor 11 (step S46), the debugging module 13 requests the second microprocessor 12 to shift to the debugging mode in accordance with the setting for the synchronous stop target (step S47).

(4) Thereafter, the second microprocessor 12 shifts to the debugging mode, informs this to the debugging module 13 (step S48), and stops operating with the instruction fetching request issued to the second debug serial bus 182 (step S49).

(5) The debugging tool 3 orders the debugging module 13 to check whether or not the first and second microprocessors 11 and 12 synchronously stop operating (step S50). The debugging module 13 monitors the debug state of the second microprocessor 12 (step S52).

(6) Detecting that the second microprocessor 12 has shifted to the debugging mode, the debugging module 13 informs this to the debugging tool 3, which confirms the mode change of the second microprocessor 12 (step S51).

The foregoing operation control (synchronous stopping of the normal operation) is carried out mainly for the first and second microprocessors 11 and 12, which are in the system LSI 10 and have high operation clock frequencies, and in the debugging module 13, so that it is possible to shorten a time (synchronous stopping time) between the stopping of the first microprocessor 11 and that of the second microprocessor 12. Therefore, the microprocessor (i.e. the second microprocessor 12) which is continuing the normal operation is prevented from destroying a cause of bugs.

(d) Resource Access: Data Writing in Register

The debugging system 1 gains access to the resources as described hereinafter. As for software for operating the system LSI 10, the resources to be debugged are a register, a memory and an I/O interface which are in the first processor core 110 of the first microprocessor 11, and a register, a memory and an I/O interface which are in the second processor core 120 of the second microprocessor 12. The foregoing registers, memories and I/O interfaces are not shown in drawings. The following describe how the register in the first processor core 110 performs data writing (i.e. setting a register value of the processor core). The register in the second processor core 120 writes data similarly to the register of the first processor core 110.

Figure 11:
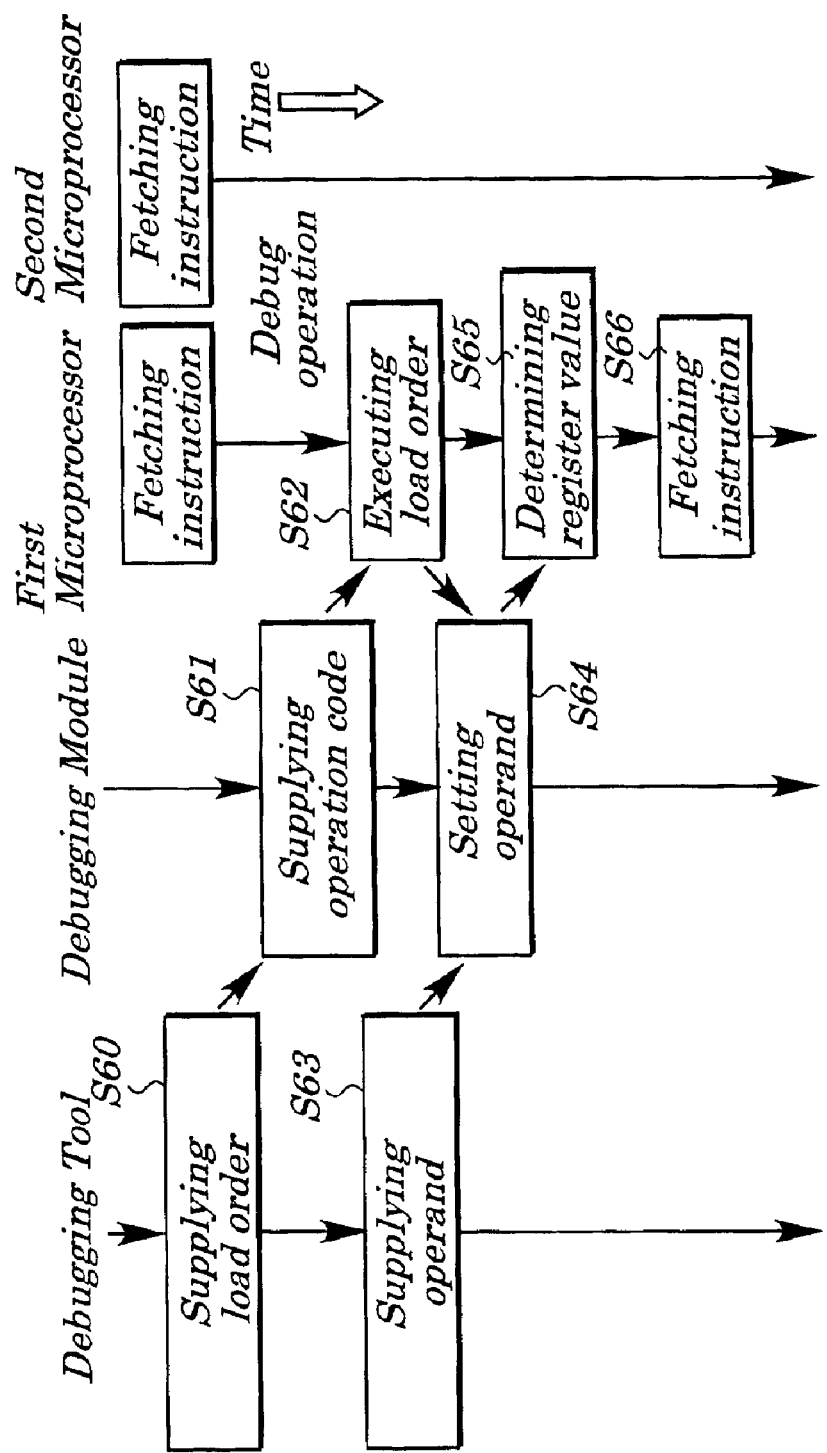

(1) Referring to FIG. 11, the debugging tool 3 orders the debugging module 13 to provide a load instruction to the first processor core 110 (step S60).

(2) The debugging module 13 provides, via the first debug serial bus 18, the load instruction to the first processor core 110 which is waiting for fetching the instruction (step S61).

(3) The processor core 110 does not execute the load instruction (step S62) until the debugging tool 3 sends an operand (register value) to the debugging module 13. In this state, the first microprocessor 11 requests the debugging module 13 to provide the operand.

(4) The debugging tool 3 supplies the operand for the load instruction to the debugging module 13 (step S64), which sets the operand (step S64).

(5) The debugging module 13 supplies the operand to the first debug serial bus 181. The operand is loaded in the first processor core 110, so that the register value of the first processor core 110 is determined (step S65). The first microprocessor 11 waits for fetching a next instruction (step S66).

The foregoing resource access (data writing in the register) of the debugging system 1 can be carried out without using the internal memory 20 on the internal main bus 14 or on the user target system 2. Further, it is possible to change the state of the internal main bus 14 by intentionally sending the load instruction to the internal main bus 14.

(e) Resource Access: Data Reading in Register

Data reading (i.e. acquiring a register value in the processor core) in the register of the first processor 110 will be described hereinafter. The following description is also applicable to the data reading in the register of the second processor core 120.

Figure 12:
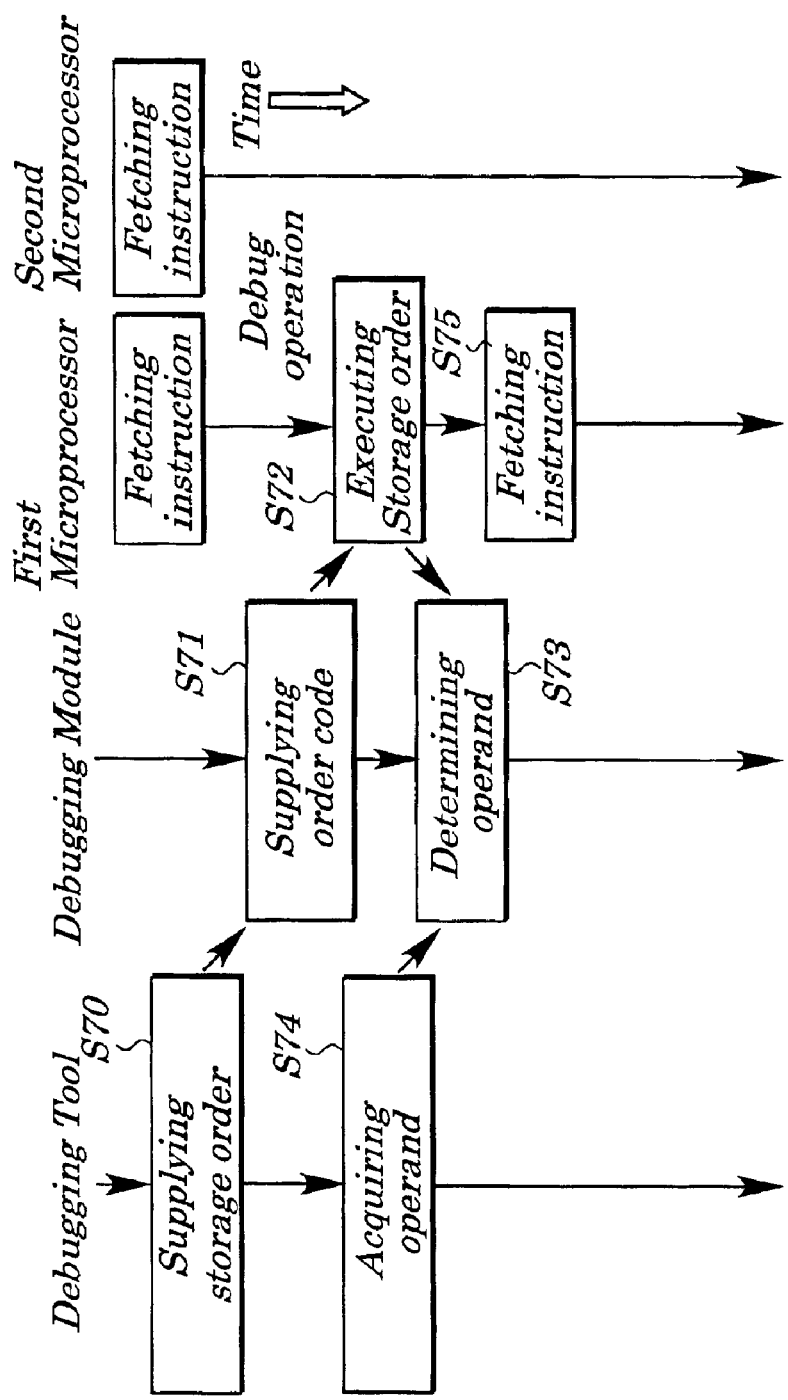

(1) Referring to FIG. 12, the debugging tool 3 orders the debugging module 13 to supply a storage instruction to the first processor core 110 (step S70).

(2) The debugging module 13 provides, via the first debug serial bus 181, the storage instruction to the first microprocessor 11 which is waiting for fetching the instruction (step S71).

(3) The first processor core 110 executes the storage instruction (step S72). In this state, the debugging module 13 provides an operand to the first processor core 110.

(4) The first processor core 110 provides the operand for the storage instruction to the debugging module 13, which determines the operand (step S73).

(5) The debugging tool 3 acquires the operand stored in the debugging module 13 (step S74). The first microprocessor 11 waits for fetching a next instruction (step S75).

This resource access of the debugging system 1 can be carried out without using the internal memory 20 on the internal main bus 14 or user target system 2. Further, it is possible to change the state of the internal main bus 14 by intentionally sending the load instruction to the internal main bus 14. Still further, the data reading and writing in the register may be combined in order that the first and second microprocessors 11 and 12 and peripheral units thereof can continue the debugging task even if the internal main bus 14 is out of order.

(f) Resource Access: Access to Memory and I/O Interface

The following describe how the main memory and I/O interface of the first processor core 110 are accessed in order to acquire a memory value. This description also applies to the second processor core 120.

(1) Referring to FIG. 13, the first microprocessor 11 normally operates without any relation with the debugging module 13 (step S80), and refers to and updates program data (step S81).

(2) The debugging tool 3 orders the debugging module 13 to read a memory instruction in order to acquire memory data in the first processor core 110 which is executing the program (step S82).

(3) The debugging module 13 accesses a specified address in the main memory of the first processor core 110 (steps S83 and S84).

(4) The data in the main memory are stored as a memory value acquired by the debugging module 13 (step S85).

(5) The debugging module 8 acquires the memory value stored in the debugging module 13 (step S86).

The foregoing resource access of the debugging system 1 (accesses to the main memories and I/O interfaces of the first and second processor cores 110 and 120 of the first and second microprocessors 11 and 12) can be carried out using the direct route between the debugging module 13 and the internal main bus 14. In short, the memory values and states of the I/O interfaces can be confirmed without interrupting the normal operation of the first and second microprocessors 11 and 12. This is effective in monitoring states of the user program and registers.

The debugging system 1 can set values of the main memories and I/O interfaces as desired. For instance, this feature is effective in modifying an incomplete user program without interrupting the operation of the microprocessor 11 when the I/O interface in the first processor core 110 is controlled in place of the first microprocessor 11. This also applies to the second microprocessor 12. Further, if the debug serial bus 181 cannot be accessed because the first microprocessor 11 is out of order, it is possible to control the second microprocessor 12 which is normal and to reliably stop the I/O interface on the debugging system 1.

In the system LSI 10, user target system 2 and debugging system 1, if the debugging task has to be carried out because of an error on the internal main bus 14, the debugging program and data necessary for the debugging task can be transferred not only via the route which extends from the debugging tool 3 to the first microprocessor 11 via the debugging module 13 and the first debug serial bus 181 but also via the route which extends from the debugging tool 3 to the second microprocessor 12 via the debugging module 13 and the second debug serial bus 182. Both of the foregoing routes are independent from the internal main bus 14. Therefore, the first and second microprocessors 11 and 12 can have sufficient debugging functions without any additional hardware.

In the system LSI 10, user target system 2 and debugging system 1, the debugging module 13 is directly connected to the internal main bus 14, and includes the internal DMA controller 139 for performing the memory access. The debugging tool 3 can directly transfer the programs or the like using the DMA controller 139, which is effective in improving downloading of user programs.

Further, in the system LSI 10, user target system 2 and debugging system 1, the first debug support unit 112 controls the debugging functions of the first processor core 110 and is connected to the debugging module 13 via the first debug control bus 191. In other words, the debugging module 13 monitors the debug state of the first microprocessor 11, and issues the debug interruption signal thereto. The second debug support unit 122 controls the debugging functions of the first processor core 120 and is connected to the debugging module 13 via the second debug control bus 192. The debugging module 13 monitors the debug state of the first and second microprocessors 11 and 12 independently. Specifically, the debugging module 13 monitors the debug state of the second microprocessor 12, and issues the debug interruption signal thereto. This configuration enables the first and second microprocessors 11 and 12 to shift to the debugging mode from the user mode without adversely affecting their synchronous operation.

Still further, the debugging module 13 orders the first and second debug support units 112 and 122 to optionally delay timings to return to the user mode from the debugging mode, via the first and second debug control bases 191 and 192, respectively. This configuration enables the first and second microprocessors 11 and 12 to shift to the debugging mode from the user mode without adversely affecting their synchronous operation.

(Other Embodiments of the Invention)

The invention has been described with reference to one embodiment.

An additional circuit (i.e. semiconductor integrated circuit) may be mounted on the user target system 2 in order to accelerate the interface speed. A serial-to-parallel conversion circuit is usable as such a circuit.

The invention is not always limited to the system LSI 10, user target system 2 and debugging system 1 which performs the image compression/expansion but is applicable to a semiconductor circuit, a system board and a debugging system which have to compute a great amount of data and perform multiple processing.

According to the invention, the microprocessors are connected to the debugging module via the debug serial buses. The debugging data necessary for the debugging task are transferred each of the microprocessors via the debug serial buses. Therefore, the multiple processing system can reliably debug bugs.

Further, the debugging tool is connected to the internal main bus via the debugging module, and directly accesses the memory on the internal main bus. This improves data transferring efficiency of the debugging tool.

Still further, the debugging module requests each of the microprocessors to perform the debug interruption independently, so that the microprocessors can shift to the debugging mode from the user mode without adversely affecting their synchronous operations. Further, the debugging module orders the microprocessors to optionally delay returning to the user mode from the debugging mode, which enables the microprocessors to resume the normal operation without adversely affecting their synchronous operations.

Although the invention has been described with reference to some embodiments thereof, it will be understood by those skilled in the art that various modifications are possible without departing from the spirit of the present invention.

What is claimed is:

1. A semiconductor integrated circuit comprising:
   an internal main bus;
   first and second microprocessors sharing said internal main bus;
   a first debug serial bus with one end thereof connected to said first microprocessor;
   a second debug serial bus with one end thereof connected to said second microprocessor;
   a debugging module connected to the other ends of said first and second debug serial buses and transferring at least a debugging program and debugging data to said first microprocessor via said first debug serial bus and to said second microprocessor via said second debug serial bus;
   a first debug supporting unit provided in said first microprocessor and controlling a debugging function of said first microprocessor;
   a second debug supporting unit provided in said second microprocessor and controlling a debugging function of said second microprocessor;
   a first debug controlling bus which connects said first debug supporting unit and said debugging module; and
   a second debug controlling bus which connects said second debug supporting unit and said debugging module.

2. The semiconductor integrated circuit of claim 1 further comprising a dedicated external debugging terminal which connects said debugging module and a debugging tool for controlling a debugging task in accordance with a debugging program.

3. The semiconductor integrated circuit of claim 2, wherein said debugging module is directly connected to said internal main bus, and said debugging module carries out directly a memory access which said debugging tool sends for a memory device connected to said internal main bus.

4. The semiconductor integrated circuit of claim 1, wherein said debugging module is directly connected to said internal main bus.

5. The semiconductor integrated circuit of claim 1 further comprising a memory controller, a direct memory access controller and an input/output controller, all of which are connected to said internal main bus.

6. The semiconductor integrated circuit of claim 5, wherein said debugging module comprises:
- an external debug interface connected to an external debugging tool;
- a multi-debug control register connected to said external debug interface and said first and second microprocessors;
- a debug control register, an address register, a byte enabling register and a data register, all of which are connected to said external debug interface;
- a debug serial bus converting circuit connected to said debugging control register;
- a debug serial bus selector connected to said multi-debug control register, said debug serial bus converting circuit and said first and second debug serial buses; and
- an internal direct memory access controller connected to said debug control register, said address register, said byte enabling register, said data register and said internal main bus.

7. The semiconductor integrated circuit of claim 6, wherein said debugging module monitors not only a debug state of said first microprocessor via said first debug controlling bus but also a debug state of said second microprocessor via said second debug controlling bus, and demands debugging interruption signal for shifting to a debugging mode.

8. The semiconductor integrated circuit of claim 5, wherein said debugging module monitors not only a debug state of said first microprocessor via said first debug controlling bus but also a debug state of said second microprocessor via said second debug controlling bus, and demands debugging interruption signal for shifting to a debugging mode.

9. The semiconductor integrated circuit of claim 1, wherein said debugging module monitors not only a debug state of said first microprocessor via said first debug controlling bus but also a debug state of said second microprocessor via said second debug controlling bus, and demands debugging interruption signal for shifting to a debugging mode.

10. The semiconductor integrated circuit of claim 1, wherein said debugging module optionally demands each of said first and second microprocessors to delay returning to a user mode from a debugging mode.

11. The semiconductor integrated circuit claim 1, wherein:
said first microprocessor comprises a first bus interface unit connected not only to a microprocessor core thereof but also to said first debug serial bus and said internal main bus; and said second microprocessor comprises a second bus interface unit connected not only to a microprocessor core thereof but also to said second debug serial bus and said internal main bus.

12. The semiconductor integrated circuit of claim 11, wherein:
said first bus interface unit comprises an internal main bus/debug serial bus controlling circuit connected to said debugging module and said microprocessor core, a parallel-to-serial converting circuit connected to said debugging module and said internal main bus/debug serial bus controlling circuit, a serial-to-parallel converting circuit connected to said debugging module and said parallel-to-serial converting circuit, and a selector connected to said microprocessor core, said internal main bus/debug serial bus controlling circuit, said parallel-to-serial converting circuit and said serial-to-parallel converting circuit; and said second bus interface unit comprises an internal main bus/debug serial bus controlling circuit connected to said debugging module and said microprocessor core, a parallel-to-serial converting circuit connected to said debugging module and said main bus/debug serial bus controlling circuit, a serial-to-parallel converting circuit connected to said debugging module and said parallel-to-serial converting circuit, and a selector connected to said microprocessor core, said internal main bus/debug serial bas controlling circuit, said parallel-to-serial converting circuit and said serial-to-parallel converting circuit.

13. A system board comprising:

a wiring board;

a semiconductor integrated circuit which comprises an internal main bus, first and second microprocessors sharing said internal main bus, a first debug serial bus with one end thereof connected to said first microprocessor, a second debug serial bus with one end thereof connected to said second microprocessor, and a debugging module connected to the other ends of said first and second debug serial buses and transferring at least a debugging program and debugging data to said first microprocessor via said first debug serial bus, and to said second microprocessor via said second debug serial bus;

a memory mounted on said wiring board and storing at least debugging data;

a memory mounted on said wiring board and storing at least debugging data;

a first debug supporting unit provided in said first microprocessor and controlling a debugging function of said first microprocessor; and a second debug supporting unit provided in said second microprocessor and controlling a debugging function of said second microprocessor;

a first debut controlling bus which connects said first debug supporting unit and said debugging module; and a second debug controlling bus which connects said second debugging support unit and said debugging module.

14. The system board of claim 13 further comprising an input/output interface circuit mounted on said wiring board.

15. The system board of claim 13 further comprising a dedicated debug interface terminal which connects said debugging module of said semiconductor integrated circuit and a debugging tool for controlling a debugging operation in accordance with a debugging program.

16. The system board of claim 13, wherein said semiconductor integrated circuit further comprises a memory controller, a direct memory access controller and an input/output controller, all of which are connected to said internal main bus.

17. A debugging system comprising:

a wiring board;

a semiconductor integrated circuit which is mounted on said wiring board and comprises: an internal main bus; first and second microprocessors sharing said main internal bus; a first debug serial bus with one end thereof connected to said first microprocessor; a second debug serial bus with one end thereof connected to said second microprocessor; and a debugging module connected to the other ends of said first and second debug serial buses and transferring at least a debugging program and debugging data to said first microprocessor via said first debug serial bus, and to said second microprocessor via said second debug serial bus;

a memory mounted on said wiring board and storing at least debugging data; and a debugging tool connected to said debugging module of said semiconductor integrated circuit;

a first debug supporting unit provided in said first microprocessor and controlling a debugging function of said first microprocessor; and a second debug supporting unit provided in said second microprocessor and controlling a debugging function of said second microprocessor;

a first debug controlling bus which connects said first debug supporting unit and said debugging module; and a second debug controlling bus which connects said second debug supporting unit and said debugging module.

18. The debugging system of claim 17, wherein said semiconductor integrated circuit further comprises a memory controller, a direct memory access controller and an input/output controller, all of which are connected to said internal main bus.

* * * * *